(12) United States Patent
Roberts et al.

(10) Patent No.: US 10,452,548 B2
(45) Date of Patent: Oct. 22, 2019

(54) PREEMPTIVE CACHE WRITEBACK WITH TRANSACTION SUPPORT

(71) Applicant: ADVANCED MICRO DEVICES, INC., Sunnyvale, CA (US)

(72) Inventors: David A. Roberts, Boxborough, MA (US); Elliot H. Mednick, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 126 days.

(21) Appl. No.: 15/718,564

(22) Filed: Sep. 28, 2017

(65) Prior Publication Data

US 2019/0095330 A1 Mar. 28, 2019

(51) Int. Cl.
| | |
|---|---|
| *G06F 12/0804* | (2016.01) |
| *G06F 12/0811* | (2016.01) |
| *G06F 12/0831* | (2016.01) |
| *G06F 12/084* | (2016.01) |
| *G06F 12/0891* | (2016.01) |
| *G06F 12/126* | (2016.01) |

(52) U.S. Cl.
CPC ...... *G06F 12/0831* (2013.01); *G06F 12/0804* (2013.01); *G06F 12/0811* (2013.01); *G06F 12/0891* (2013.01); *G06F 12/126* (2013.01); *G06F 12/084* (2013.01); *G06F 2212/1024* (2013.01); *G06F 2212/1044* (2013.01); *G06F 2212/283* (2013.01); *G06F 2212/452* (2013.01); *G06F 2212/507* (2013.01); *G06F 2212/60* (2013.01); *G06F 2212/621* (2013.01)

(58) Field of Classification Search
CPC ............. G06F 12/0804; G06F 12/0811; G06F 12/0831; G06F 12/084; G06F 12/0891; G06F 12/126; G06F 2212/1024; G06F 2212/1044; G06F 2212/283; G06F 2212/452; G06F 2212/507; G06F 2212/60; G06F 2212/621
See application file for complete search history.

(56) References Cited

U.S. PATENT DOCUMENTS

| | | | |
|---|---|---|---|
| 2003/0056062 A1* | 3/2003 | Prabhu | G06F 12/0804 711/143 |
| 2013/0151778 A1* | 6/2013 | Daly | G06F 12/0897 711/122 |
| 2017/0364262 A1* | 12/2017 | Roberts | G06F 3/061 |

* cited by examiner

*Primary Examiner* — Aracelis Ruiz (57) ABSTRACT

A method of preemptive cache writeback includes transmitting, from a first cache controller of a first cache to a second cache controller of a second cache, an unused bandwidth message representing an unused bandwidth between the first cache and the second cache during a first cycle. During a second cycle, a cache line containing dirty data is preemptively written back from the second cache to the first cache based on the unused bandwidth message. Further, the cache line in the second cache is written over in response to a cache miss to the second cache.

20 Claims, 5 Drawing Sheets

PREEMPTIVE CACHE WRITEBACK WITH TRANSACTION SUPPORT

GOVERNMENT LICENSE RIGHTS

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

Processing systems typically implement one or more compute complexes, each compute complex having multiple processor cores and a cache hierarchy which has two or more levels of caches. A latency period is associated with the time between when a processor core requests data and the time the requested data is received. To minimize the time that processor cores spend idling and waiting for data, many processing systems use cache memory in the cache hierarchy to store temporary copies of program instructions and data. In the cache hierarchy, each processor core is associated with one or more levels of caches that are private to a corresponding core (hereinafter, the "private caches"). The processing system further implements a shared cache at another level of the cache hierarchy, wherein the shared cache is shared among the processor cores of the compute complex (hereinafter, the "shared cache").

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate techniques for utilizing preemptive cache writeback to reduce the number of dirty lines within caches, thereby reducing the latency of future cache misses due to writeback of "dirty" lines (that is, cache lines that have been modified at the cache and have not yet been written to a lower level cache). To illustrate, in a multi-core processing system in which each core is associated with one or more levels of private caches and the cores share a shared cache at another, non-private, level of the cache hierarchy, if a cache miss occurs at a cache, the corresponding cache controller may need to evict a cache line to make room for the "missed" data (i.e., the data associated with the memory address that resulted in the cache miss). Conventionally, if the cache line to be evicted is a dirty cache line, the cache controller preserves memory coherence by writing the dirty cache line (referred to as "writeback") to a lower level cache or to main memory before evicting the cache line. Writeback therefore introduces a performance penalty for each cache miss that results in the writeback of a dirty cache line.

To ameliorate this performance penalty, in various embodiments a processing system employs preemptive cache writeback by periodically transmitting, from a cache controller of a first cache and a cache controller of a second cache, an unused bandwidth message representing unused bandwidth between the first and second cache during a first cycle. A number of cache lines is calculated, at the cache controller of the second cache, that may be preemptively written from the second cache to the first cache without exceeding unused bandwidth based on the unused bandwidth message. During a second cycle, the calculated number of cache lines are preemptively written back, from the second cache to the first cache. This preemptive cache writeback of the calculated number of cache lines reduces a number of dirty cache lines in the second cache prior to encountering cache misses that would require eviction of dirty cache lines from the second cache. Accordingly, data associated with future cache misses to the second cache may be written over without waiting on writebacks to lower level caches and/or to system memory, thereby reducing waste of system resources (e.g., bandwidth between the caches) and improving performance.

Figure 1:
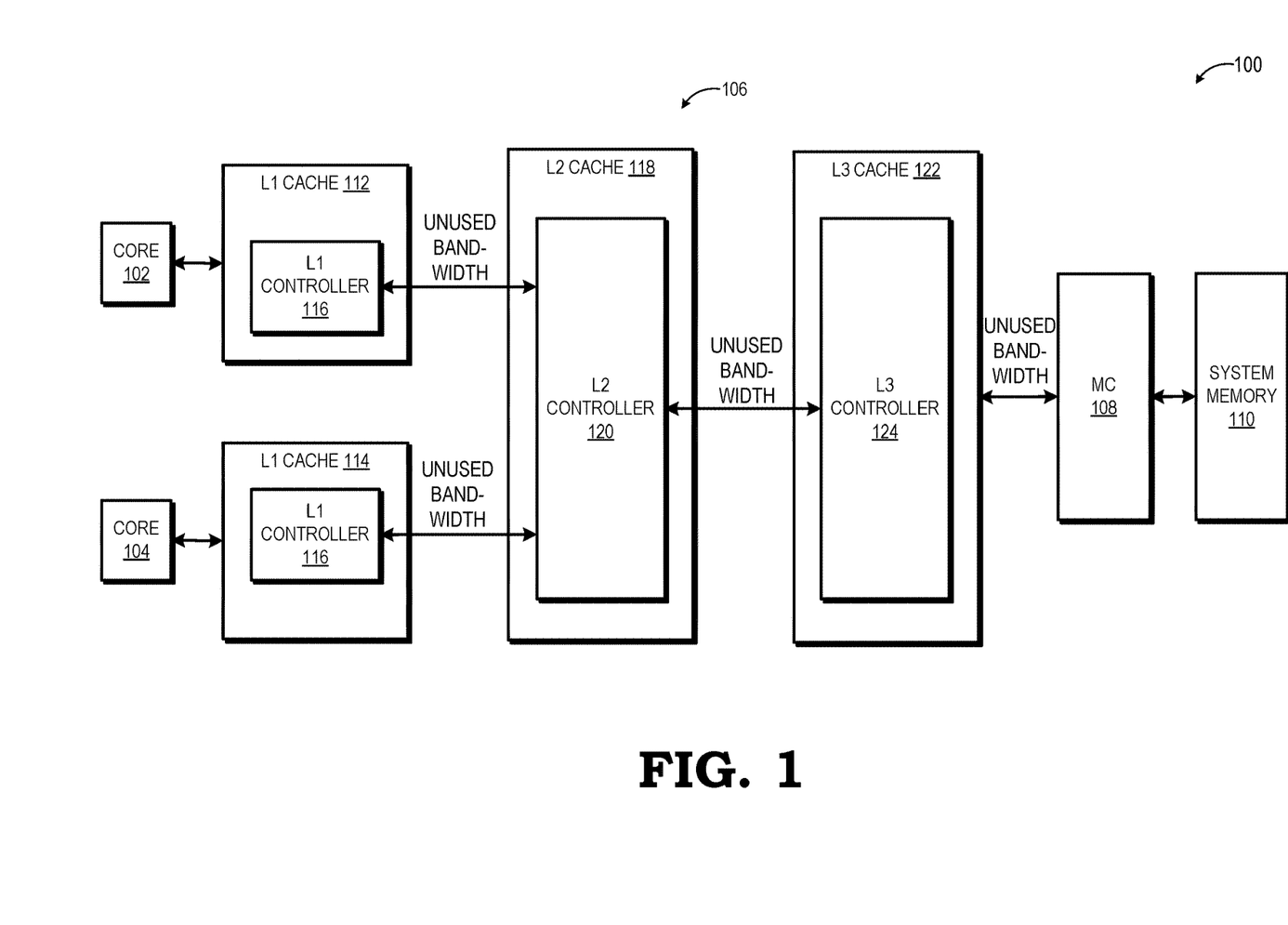
FIG. 1 is a block diagram of a processing system utilizing preemptive cache writeback in accordance with some embodiments.

FIG. 1 illustrates a processing system 100 utilizing preemptive cache writeback in accordance with at least some embodiments. In the depicted example, the processing system 100 includes a plurality of processor cores, such as the two processor cores 102 and 104, a cache hierarchy 106, a memory controller 108, and a system memory 110. The processor cores 102, 104 include, for example, central processing unit (CPU) cores, graphics processing unit (GPU) cores, digital signal processor (DSP) cores, or a combination thereof. It will be appreciated that the number of processor cores of the processing system may be fewer or more than two.

The memory controller 108 operates as the interface between the cache hierarchy 106 and the system memory 110. Thus, data to be cached in the cache hierarchy 106 typically is manipulated as blocks of data referred to as "cache lines", and which are addressed or otherwise located in a memory hierarchy using a virtual or a physical address associated with system memory 110. In some embodiments, each cache line also stores additional data used to manage the cache line, such as cache line tag data for identifying the memory address associated with a cache line and/or cache coherency data used to synchronize the data in the cache line with other caches or with the system memory 110. In various embodiments, the cache tag can be formed from all or a portion of the memory address associated with the cache line. Cache lines are accessed from the system memory 110 by the memory controller 108 in response to memory requests from the cache hierarchy 106. Likewise, when a cache line containing modified data is evicted from the cache hierarchy 106 and thus needs to be updated in the system memory 110, the memory controller 108 manages this write-back process.

The cache hierarchy 106 includes two or more levels of caches. In the illustrated example, the cache hierarchy 106 includes three cache levels: level 1 (L1), level 2 (L2), and level 3 (L3). For L1, the processing system 100 implements small private caches for each processing core, which are depicted as L1 caches 112, 114 each associated with a corresponding one of processor cores 102, 104. Each of the L1 caches 112, 114 implements a L1 cache controller 116 that processes memory access requests from the processor cores 102, 104. In this embodiment, each of the L1 caches 112, 114 is illustrated as a single cache memory capable of storing any type of data potentially required by their respective processor cores 102, 104. However, other embodiments can include separate L1 cache units associated with each processor core 102, 104 for storing different types of data separately, such as program instruction caches, program data caches, and translation lookaside buffer data caches.

For L2, the processing system 100 implements a larger (in storage size relative to the L1 caches 112, 114) L2 cache 118. As illustrated, the L2 cache 118 is shared by the processor cores 102, 104. In some embodiments, the processing system 100 uses an inclusive cache design in which data stored within the L1 cache(s) 112, 114 is also duplicated in the L2 cache 118. In other embodiments, the processing system 100 uses an exclusive cache design in which caches never share data. The L2 cache 118 implements a L2 cache controller 120 that manages the shared L2 cache 118 and helps maintain coherence of on-chip data through various coherence schemes. Cache misses occur when the data or instructions that the processor cores 102, 104 need are not in the cache(s). For example, L1 cache misses are sent to the L2 cache controller 120, which then checks the L2 cache 118 for a hit (i.e., desired data or instruction is in the L2 cache).

For L3, the processing system 100 implements a L3 cache 122 that is generally larger in storage size relative to the L2 cache 118 and L1 caches 112, 114. The L3 cache 122 is shared by the processor cores 102, 104, and thus shared by at least the L1 caches 112, 114 and L2 cache 118. The L3 cache 122 implements a L3 cache controller 124 that manages the L3 cache 122 and helps maintain coherence of on-chip data through various coherence schemes. L2 cache misses are sent to the L3 cache controller 124, which then checks the L3 cache 122 for a hit (i.e., desired data or instruction is in the L3 cache).

Although each of the L1 caches 112, 114 is private to its corresponding processor core, the cache hierarchy 104 operates to maintain coherency between the L1 caches 112, 114, L2 cache 118, and L3 cache 122. In particular, the L1 caches 112, 114, L2 cache 118, and L3 cache 122 implement a memory coherence protocol (referred to herein as simply a "coherence protocol"). Each cache line is associated with a corresponding coherency information, as governed by the coherency protocol, to indicate the coherence state of the cache line, as well as how the cache line may be handled under the rules of the coherence protocol.

For example, the coherence protocol may establish coherence states such as "modified" indicating that the cache line can be modified at the corresponding cache, "exclusive" indicating that the corresponding cache line cannot be modified at caches associated with other processor cores, and "shared", indicating that the cache line is shared by multiple caches of the cache hierarchy 104, and therefore should not be modified. For specified events, as defined by the particular coherence protocol implemented by the processing system, a cache of the cache hierarchy 104 can issue a cache probe to identify the coherence status of a given cache line at other caches. For example, prior to changing the coherence status of a cache line from shared to exclusive, a cache can issue a cache probe to identify whether the cache line is stored at any other cache and, if so, the coherence status of the cache line at the caches that store the cache line. Based on responses to the probe, the cache that issued the probe can take appropriate action, as required under the rules of the coherence protocol. For example, if no other caches store the cache line, the cache can change the state of the cache line from "shared" to "exclusive."

As indicated above, the cache memories of the cache hierarchy 106 are typically partitioned into a fixed number of cache memory locations, referred to as cache lines. Typically, each cache line is associated with a set of system memory addresses. Each cache line is adapted to store a copy of program instructions and/or data from one of its associated system memory addresses. When one of the processor cores 102, 104 modifies or updates data stored in a cache memory location, this data will eventually need to be copied back into system memory. If data stored in a cache line is modified within one of the cache memories of the cache hierarchy 106 (e.g., L1 caches 112, 114, L2 cache 118, and/or L3 cache 122) but not modified to be reflected in system memory 110, the data in the cache memory is referred to as "dirty data." Typically, a processor or processor core defers updating system memory 110 with dirty data until the processor core needs the cache line to store a copy of different data from system memory 110.

In one embodiment, each of the L1 caches 112, 114 can store a limited number of cache lines. When the capacity of a L1 cache is exceeded, one of the cache lines is removed from the L1 cache to make room for a new cache line. The removed cache line is referred to as a victim line. Victim cache lines can be selected according to a cache replacement policy, such as selecting a least recently used cache line, and/or according to caching instructions associated with a program. If the data in the victim line has not been modified by the associated processor core, then the data in the victim line may be discarded or overwritten. However, if the data in a victim line has been modified by the associated processor core (e.g., one of processor cores 102, 104), then the dirty data (i.e., modified in cache memory but not modified in system memory 110) must be copied back to the system memory 110 (or a different cache level memory) to ensure correct operation of programs. The copying of modified cache data from a cache memory to a lower-level cache memory or system memory is referred to as a writeback operation.

It will be appreciated that a performance penalty is associated with latency resulting from cache misses due to writeback of dirty cache lines. For example, when the data or instructions that the processor core 102 needs is not found in the L1 cache 112, the requested data is fetched from other cache levels (e.g., L2 cache 118 or L3 cache 122) or from system memory 110. However, if the L1 cache 112 is already full, at least one of the existing cache lines must be removed from the L1 cache 112 to make room for the new cache line(s) requested by processor core 102. If there are no clean cache lines in L1 cache 112 (which may be simply written over), latency results due to waiting on writeback of dirty cache lines before the data requested by processor core 102 can be written into L1 cache 112.

In various embodiments, such as described in more detail below, unused bandwidth (per predetermined unit of time, referred to herein as a "cycle") between different cache and/or memory levels is reported from one cache to the next level cache in memory hierarchy 106. As an example, the L2 cache controller 120 sends an unused bandwidth message to L1 cache controller 116 representing bandwidth utilization between L1 cache 112 and L2 cache 118 per cycle. In response to the unused bandwidth message, the L1 cache controller 116 calculates a number of dirty cache lines that may be written from L1 cache 112 to L2 cache 118 so as to utilize but not exceed the available unused bandwidth per cycle. During the next cycle, the calculated number of dirty cache lines are preemptively written to the next cache level lower in memory hierarchy 106 (e.g., from L1 cache 112 to L2 cache 118). The cache lines written back to L2 cache 118 may be marked as clean in L1 cache 112.

As used herein, "preemptively" refers to writing back a dirty cache line from a cache to the next cache level lower prior to encountering a cache miss to a full cache that would require eviction of at least one dirty cache line before data can be written into the full cache. Subsequently, in response to a cache miss, the cache line that was previously preemptively written back, but which still contains dirty data, may be written over without evicting any data from the cache. Accordingly, the number of dirty cache lines in L1 cache 112 is reduced and data associated with future cache misses to L1 cache 112 may be written over the clean cache lines without waiting on writebacks to lower level caches and/or to system memory 110, thereby reducing waste of system resources (e.g., bandwidth between the caches) and improving performance.

Figure 2:
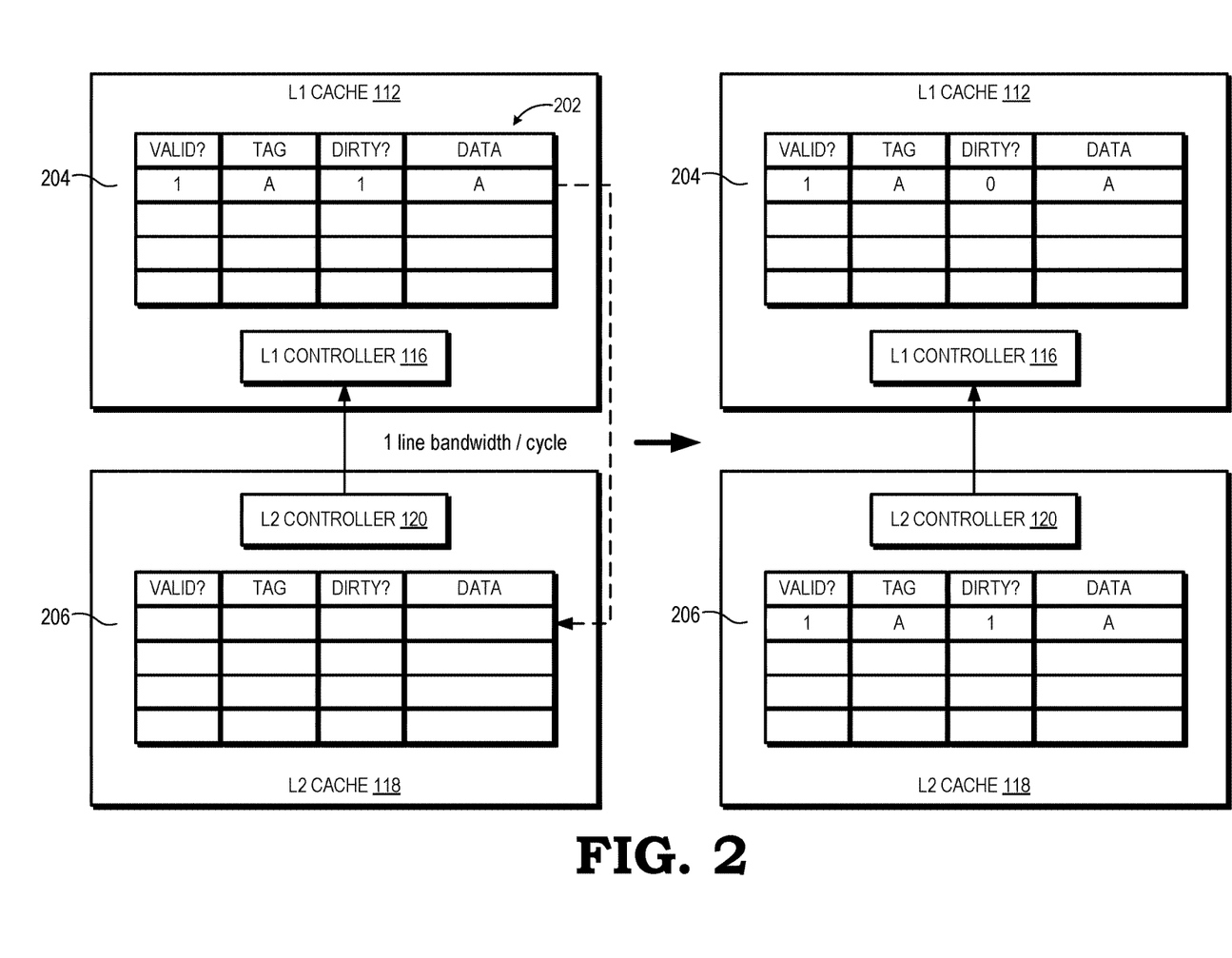
FIG. 2 is a block diagram illustrating an example preemptive cache writeback operation in accordance with some embodiments.

FIG. 2 is a diagram illustrating an example preemptive cache writeback operation in accordance with some embodiments. A typical memory contains a memory array organized into a set of cache lines. In the example of FIG. 2, each cache line in the memory array 202 includes a corresponding address tag that identifies the main memory location associated with the data stored in that cache line. Further, each cache line includes cache line status identifiers, such as a dirty bit to indicate whether data in a particular cache line is different to what is stored in system memory 110. As illustrated, a bit value of 1 represents data in the cache line is dirty and a bit value of 0 represents data in the cache line is clean. In various embodiments, each cache line also includes a valid bit to indicate whether data in a block is valid or not.

During a first cycle, the L2 cache controller 120 communicates an unused bandwidth message to L1 cache controller 116 representing bandwidth utilization between L1 cache 112 and L2 cache 118 per cycle. As illustrated in the example of FIG. 2, the L1 cache controller 116 calculates, based on the unused bandwidth message, that one dirty cache line may be written from L1 cache 112 to L2 cache 118 so as to utilize but not exceed the available unused bandwidth. Accordingly, during a second cycle, the data in dirty cache line 202 of the L1 cache 112 is written back to cache line 206 of L2 cache 118. In this example embodiment, the cache line(s) written back to L2 cache 118 is marked as clean in L1 cache 112. Thus, the number of dirty cache lines in L1 cache 112 is reduced and data associated with future cache misses to L1 cache 112 may be written over cache line 204 without waiting on writeback of the data A to lower level cache(s) and/or to system memory 110.

In the example of FIG. 2, the cache hierarchy utilizes a hierarchy (which is not strictly exclusive in that cache lines are allowed to exist in multiple caches but does not require it) in which all cache lines in the higher-level cache (i.e., L1 cache 112) are also present in the lower-level cache (i.e., L2 cache 118). Copies of the cache line containing data A are present in both L1 cache 112 and L2 cache 118 after preemptive cache line writeback, even if the cache line 204 is marked as clean and the cache line 206 is marked as dirty. Further, in this example, an allocation policy is used where a cache line is first allocated to the L1 cache 112 on a cache miss. The L2 cache 118 operates as a victim cache in that it receives a copy of the cache line after a writeback operation. In other embodiments, the cache hierarchy may utilize a strictly exclusive hierarchy in which the lower-level cache (i.e., L2 cache 118) contains cache lines that are not present in the higher-level cache (i.e., L1 cache 112). In such embodiments (not shown), the copy of the cache line is evicted from the higher-level cache after preemptive cache line writeback. In other embodiments, the cache hierarchy may alternatively utilize a strictly inclusive hierarchy in which both the L1 cache 112 and L2 cache 118 get a copy of the cache line on write in response to a cache miss.

Although only the L1 cache 112 and L2 cache 118 are illustrated in the example of FIG. 2, it will be understood that the described preemptive cache line writeback described herein may be performed between any cache memories of in a memory hierarchy (e.g., cache hierarchy 106 of FIG. 1). For example, the L3 controller 124 may communicate an unused bandwidth message to L2 cache controller 120 representing bandwidth utilization between L3 cache 122 and L2 cache 118 per cycle. In various embodiments, such preemptive cache line writeback may be applied to any level of the cache hierarchy 106 or may be concurrently performed each cycle between all caches of the cache hierarchy 106 (e.g., for each cycle, between L1 cache 112/L2 cache 118 and further between L2 cache 118/L3 cache 122).

Further, it will be understood that the described preemptive cache line writeback described herein is not limited to unused bandwidth between caches and may further be applied to any memory in the memory hierarchy. In some embodiments, the preemptive cache line writeback operations described herein may be applied between system memory 110 and a last-level cache of the cache hierarchy. For example, in the context of FIG. 1, the memory controller 108 may communicate an unused bandwidth message to L3 cache controller 124 representing bandwidth utilization between L3 cache 122 and system memory 110 per cycle.

Figure 3:
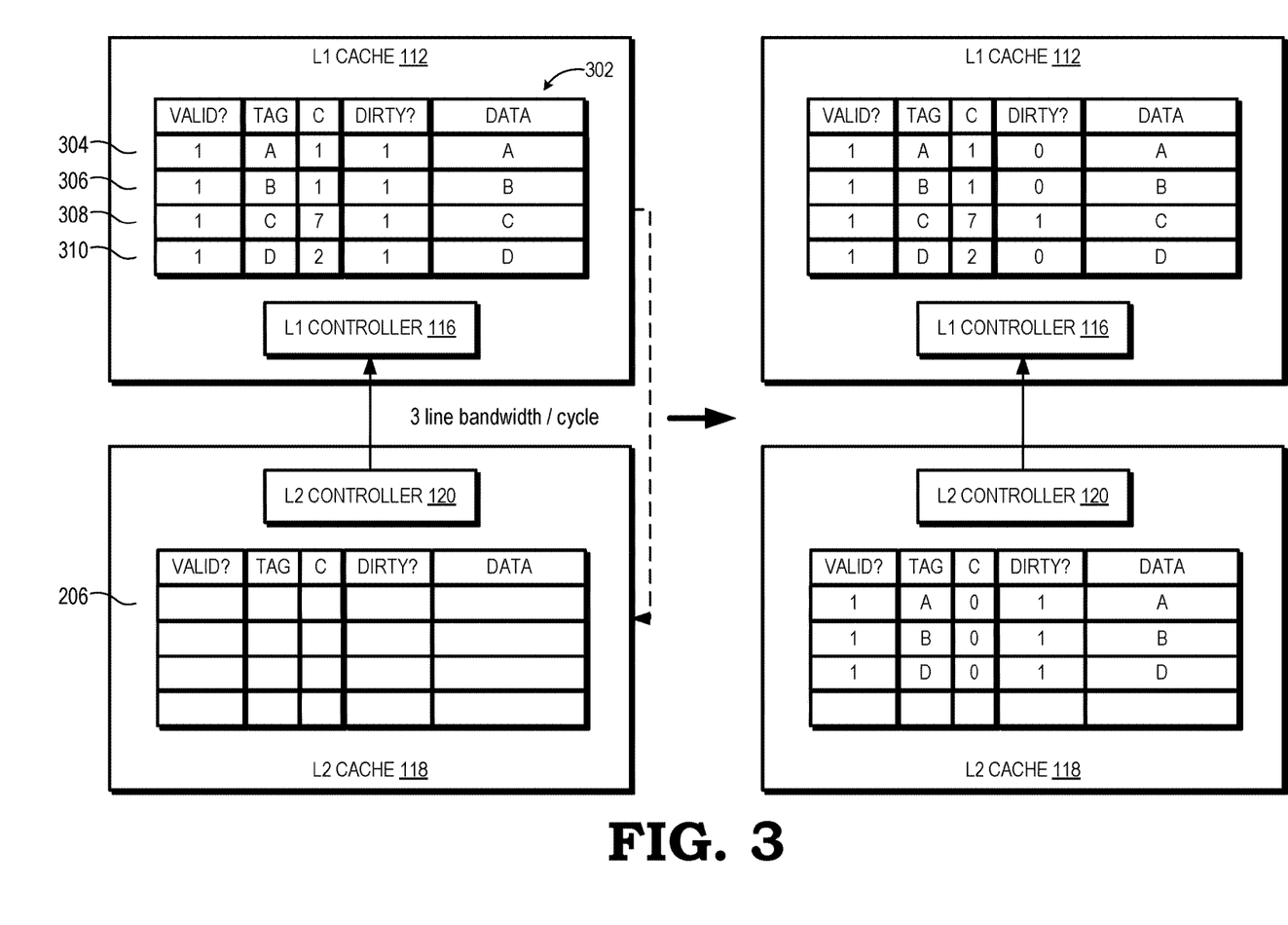
FIG. 3 is a block diagram illustrating another example preemptive cache writeback operation in accordance with some embodiments.

In various embodiments as described herein, selection of dirty cache lines for preemptive writeback may be performed according to standard cache replacement policies such as, for example, a least recently used (LRU) policy in which the caches write back the least recently used items first as is generally known. In other embodiments, preemptive cache writeback may be optimized by providing counters for each cache line. FIG. 3 is a diagram illustrating another example preemptive cache writeback operation in accordance with some embodiments.

In the example of FIG. 3, each cache line in the memory array 302 includes a corresponding address tag that identifies the main memory location associated with the data stored in that cache line. Each cache line includes cache line status identifiers, such as a dirty bit to indicate whether data in a particular cache line is different to what is stored in system memory 110. As illustrated, a bit value of 1 represents data in the cache line is dirty and a bit value of 0 represents data in the cache line is clean. In various embodiments, each cache line also includes a valid bit to indicate whether data in a block is valid or not. Further, each cache line also includes a counter bit, which resets periodically based on a predetermined schedule, that increments each time the data in the cache line is written. For example, the data A in cache line 304 of L1 cache 112 has been written or otherwise modified once since the most recent counter reset. The data B in cache line 306 of L1 cache 112 has been written or otherwise modified once since the most recent counter reset. The data C in cache line 308 of L1 cache 112 has been written or otherwise modified seven times since the most recent counter reset, and the data D in cache line 310 of L1 cache 112 has been written or otherwise modified two times since the most recent counter reset.

During a first cycle, the L2 cache controller 120 communicates an unused bandwidth message to L1 cache controller 116 representing bandwidth utilization between L1 cache 112 and L2 cache 118 per cycle. As illustrated in the example of FIG. 3, the L1 cache controller 116 calculates, based on the unused bandwidth message, that three dirty cache lines may be written from L1 cache 112 to L2 cache 118 so as to utilize but not exceed the available unused bandwidth. Accordingly, during a second cycle, the data in three dirty cache lines of the L1 cache 112 are written back to the L2 cache 118. In this example embodiment, the L1 cache controller 116 determines which cache lines are to be written back by selecting the cache lines with low counter values for writeback before those with high values. As cache lines with higher counter values are more likely to result in a write hit in the near future, and therefore be written to contain dirty data, prioritizing the preemptive writeback of low counter cache lines reduces writeback traffic and increases the efficiency of the preemptive writeback process. Further, the reduction in writeback traffic reduces wear of non-volatile memory at the lower levels of the memory hierarchy.

Accordingly, as illustrated in FIG. 3, the L1 cache controller 116 determines that cache lines 304, 306, and 310 have the lowest three counter values and during the second cycle, the data in three dirty cache lines of the L1 cache 112 are written back to the L2 cache 118. Thus, in this example embodiment, the cache lines 304, 306, and 310 written back to L2 cache 118 are marked as clean in L1 cache 112. The number of dirty cache lines in L1 cache 112 is reduced and data associated with future cache misses to L1 cache 112 may be written over cache lines 304, 306, and 310 without waiting on writeback of the data A, B, and D to lower level cache(s) and/or to system memory 110. It will further be appreciated that future cache misses to L1 cache 112 will result in L1 cache controller 116 prioritizing writing to clean cache lines 304, 306, and 310 over cache line 308 which would remain marked as dirty.

Similar to the example of FIG. 2, the cache hierarchy of FIG. 3 a hierarchy (which is not strictly exclusive in that cache lines are allowed to exist in multiple caches but does not require it) in which all cache lines in the higher-level cache (i.e., L1 cache 112) are also present in the lower-level cache (i.e., L2 cache 118). Accordingly, copies of the cache line containing data A, B, and D are present in both L1 cache 112 and L2 cache 118 after preemptive cache line writeback, even if the cache lines are marked as clean in L1 cache 112 and the caches line are marked as dirty in L2 cache 118. Further, in this example, an allocation policy is used where a cache line is first allocated to the L1 cache 112 on a cache miss. The L2 cache 118 operates as a victim cache in that it receives a copy of the cache line after a writeback operation. In other embodiments, the cache hierarchy may utilize a strictly exclusive hierarchy in which the lower-level cache (i.e., L2 cache 118) contains cache lines that are not present in the higher-level cache (i.e., L1 cache 112). In such embodiments (not shown), the copy of the cache line is evicted from the higher-level cache after preemptive cache line writeback. In other embodiments, the cache hierarchy may alternatively utilize a strictly inclusive hierarchy in which both the L1 cache 112 and L2 cache 118 get a copy of the cache line on write in response to a cache miss.

Although only the L1 cache 112 and L2 cache 118 are illustrated in the example of FIG. 3, it will be understood that the described preemptive cache line writeback described herein may be performed between any cache memories of in a memory hierarchy (e.g., cache hierarchy 106 of FIG. 1). For example, the L3 controller 124 may communicate an unused bandwidth message to L2 cache controller 120 representing bandwidth utilization between L3 cache 122 and L2 cache 118 per cycle. In various embodiments, such preemptive cache line writeback may be applied to any level of the cache hierarchy 106 or may be concurrently performed each cycle between all caches of the cache hierarchy 106 (e.g., for each cycle, between L1 cache 112/L2 cache 118 and further between L2 cache 118/L3 cache 122).

Further, it will be understood that the described preemptive cache line writeback described herein is not limited to unused bandwidth between caches and may further be applied to any memory in the memory hierarchy. In some embodiments, the preemptive cache line writeback operations described herein may be applied between system memory 110 and a last-level cache of the cache hierarchy. For example, in the context of FIG. 1, the memory controller 108 may communicate an unused bandwidth message to L3 cache controller 124 representing bandwidth utilization between L3 cache 122 and system memory 110 per cycle.

Figure 4:
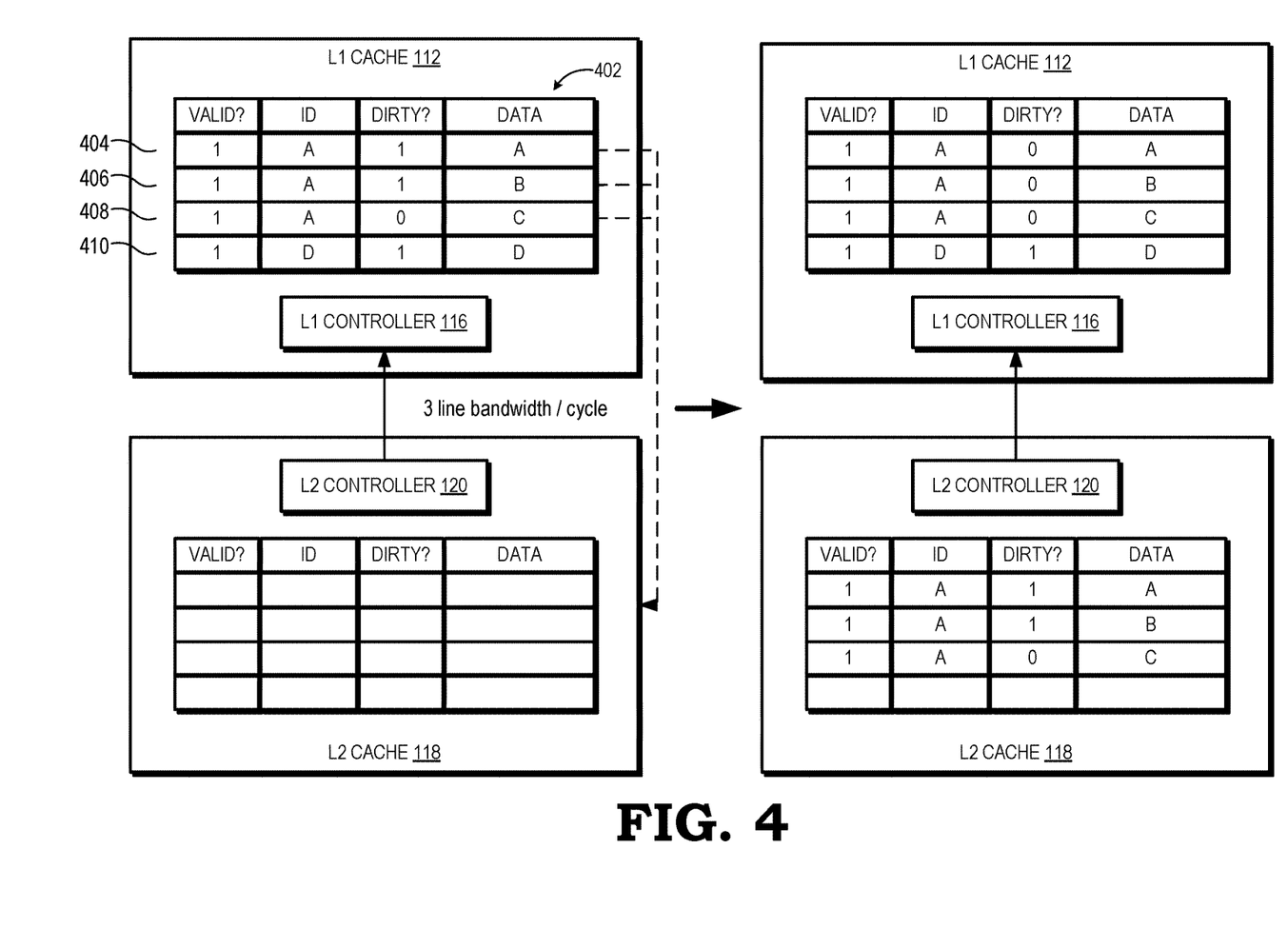
FIG. 4 is a block diagram illustrating yet another example preemptive cache writeback operation in accordance with some embodiments.

FIG. 4 is a diagram illustrating yet another example preemptive cache writeback operation in accordance with some embodiments. In the example of FIG. 4, each cache line includes cache line status identifiers, such as a dirty bit to indicate whether data in a particular cache line is different to what is stored in system memory 110. As illustrated, a bit value of 1 represents data in the cache line is dirty and a bit value of 0 represents data in the cache line is clean. In various embodiments, each cache line also includes a valid bit to indicate whether data in a block is valid or not. Further, each cache line in the memory array 402 includes a corresponding transaction identification (ID) tag that identifies the transaction ID assigned to the cache line for each demand request.

During a first cycle, the L2 cache controller 120 communicates an unused bandwidth message to L1 cache controller 116 representing bandwidth utilization between L1 cache 112 and L2 cache 118 per cycle. As illustrated in the example of FIG. 4, the L1 cache controller 116 calculates, based on the unused bandwidth message, that three dirty cache lines may be written from L1 cache 112 to L2 cache 118 so as to utilize but not exceed the available unused bandwidth. Accordingly, during a second cycle, the data in three dirty cache lines of the L1 cache 112 are written back to the L2 cache 118. In this example embodiment, the L1 cache controller 116 determines which cache lines are to be written back by prioritizing cache lines with the same transaction ID. Accordingly, as illustrated in FIG. 4, the L1 cache controller 116 determines that cache lines 404, 406, and 408 are all tagged with the transaction ID A. Thus, based on the three cache line bandwidth from the first cycle, the data in the cache lines 404, 406, and 408 are all written to the L2 cache 118 during the second cycle even though cache line 408 is marked as clean. Accordingly, the integrity and persistence of data associated with the same transaction are improved.

Similar to the examples of FIG. 2-3, the cache hierarchy of FIG. 4 utilizes a hierarchy (which is not strictly exclusive in that cache lines are allowed to exist in multiple caches but does not require it) in which all cache lines in the higher-level cache (i.e., L1 cache 112) are also present in the lower-level cache (i.e., L2 cache 118). Accordingly, copies of the cache line 404, 406, and 408 are present in both L1 cache 112 and L2 cache 118 after preemptive cache line writeback, even if the cache lines are marked as clean in L1 cache 112 and the cache lines are marked as dirty in L2 cache 118. Further, in this example, an allocation policy is used where a cache line is first allocated to the L1 cache 112 on a cache miss. The L2 cache 118 operates as a victim cache in that it receives a copy of the cache line after a writeback operation. In other embodiments, the cache hierarchy may utilize a strictly exclusive hierarchy in which the lower-level cache (i.e., L2 cache 118) contains cache lines that are not present in the higher-level cache (i.e., L1 cache 112). In such embodiments (not shown), the copy of the cache line is evicted from the higher-level cache after preemptive cache line writeback. In other embodiments, the cache hierarchy may alternatively utilize a strictly inclusive hierarchy in which both the L1 cache 112 and L2 cache 118 get a copy of the cache line in response to a cache miss.

Although only the L1 cache 112 and L2 cache 118 are illustrated in the example of FIG. 4, it will be understood that the described preemptive cache line writeback described herein may be performed between any cache memories of in a memory hierarchy (e.g., cache hierarchy 106 of FIG. 1). For example, the L3 controller 124 may communicate an unused bandwidth message to L2 cache controller 120 representing bandwidth utilization between L3 cache 122 and L2 cache 118 per cycle. In various embodiments, such preemptive cache line writeback may be applied to any level of the cache hierarchy 106 or may be concurrently performed each cycle between all caches of the cache hierarchy 106 (e.g., for each cycle, between L1 cache 112/L2 cache 118 and further between L2 cache 118/L3 cache 122).

Further, it will be understood that the described preemptive cache line writeback described herein is not limited to unused bandwidth between caches and may further be applied to any memory in the memory hierarchy. In some embodiments, the preemptive cache line writeback operations described herein may be applied between system memory 110 and a last-level cache of the cache hierarchy. For example, in the context of FIG. 1, the memory controller 108 may communicate an unused bandwidth message to L3 cache controller 124 representing bandwidth utilization between L3 cache 122 and system memory 110 per cycle.

Figure 5:
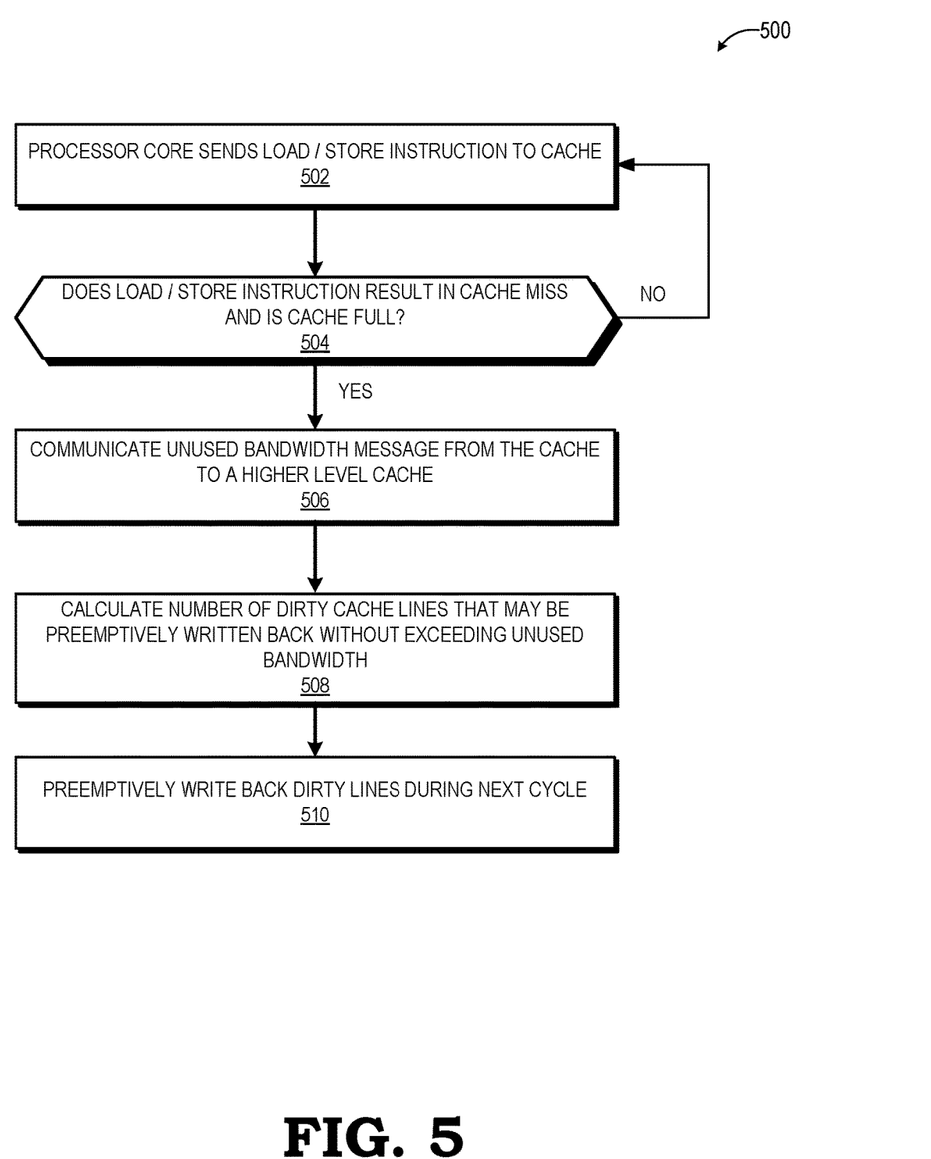
FIG. 5 is a flow diagram illustrating a method of preemptive cache writeback in accordance with some embodiments.

FIG. 5 illustrates a method 500 of performing preemptive cache writeback in accordance with some embodiments. At step 502, a processor core (such as processor core 102 of FIG. 1) sends load and/or store requests to its L1 cache (i.e., L1 cache 112). At step 504, the L1 controller determines whether the load and/or store request results in a cache miss and whether the L1 cache 112 is already full. If not, the method 500 returns to step 502 to process the next load and/or store request. However, if both the conditions of step 504 are met, the method 500 proceeds to step 506.

At step 506, one or more cache controllers of the cache hierarchy provides feedback regarding bandwidth utilization. For example, as discussed regarding FIG. 2, the L2 cache controller 120 communicates an unused bandwidth message to L1 cache controller 116 representing bandwidth utilization between L1 cache 112 and L2 cache 118 per cycle. That is, an unused bandwidth message is communicated from the lower-level cache controller (e.g., L2 cache controller 120) to the cache controller of a higher-level cache (e.g., L1 cache controller 116).

At step 508, the higher-level cache controller (e.g., L1 cache controller 116) calculates, based on the unused bandwidth message, the number of dirty cache lines that may be written to the lower level cache (e.g., L2 cache 118) so as to utilize but not exceed the available unused bandwidth. Accordingly, during the next cycle at step 510, the data in the number of calculated dirty cache lines is written back to the lower-level cache. Accordingly, during each cycle, the number of dirty cache lines in L1 cache 112 is reduced and data associated with future cache misses to L1 cache 112 may be written over without waiting on writeback of the dirty data to lower level cache(s) and/or to system memory, thereby reducing waste of system resources (e.g., bandwidth between the caches) and improving performance. Further, it will be appreciated that, in some embodiments, a user or an operating system (OS) executing aspects of the disclosure described herein may throttle the rate of writebacks, such as when the cache being written to or from is in non-volatile memory that is subject to memory wear (e.g., limited to a finite number of program-erase cycles before wear begins to deteriorate the integrity of the storage). For example, a user-defined preemptive writeback bandwidth limit may be set or the preemptive writeback may be disabled completely between one or more levels of cache.

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   transmitting, from a first cache controller of a first cache to a second cache controller of a second cache, an unused bandwidth message representing an unused bandwidth between the first cache and the second cache during a first cycle;
   preemptively writing back, during a second cycle, a cache line containing dirty data from the second cache to the first cache based on the unused bandwidth message; and
   writing over, in response to a cache miss to the second cache, the cache line in the second cache.

2. The method of claim 1, further comprising:
   calculating, at the second cache controller of the second cache, a number of cache lines that are available be preemptively written from the second cache to the first cache without exceeding the unused bandwidth.

3. The method of claim 1, further comprising:
   transmitting, from a third cache controller of a third cache and the first cache controller of the first cache, an additional unused bandwidth message representing unused bandwidth between the third cache and the first cache during the first cycle;
   preemptively writing back, during the second cycle, a second cache line containing dirty data from the first cache to the third cache based on the additional unused bandwidth message; and
   writing over, in response to a cache miss to the first cache, the second cache line without evicting any data from the first cache.

4. The method of claim 1, wherein the first cache is a lower level cache relative to the second cache.

5. The method of claim 1, wherein preemptively writing back the cache line further comprises:
   prioritizing writeback of a first cache line in the second cache associated with a first writeback counter value that is lower than a second writeback counter value of a second cache line in the second cache, wherein the first writeback counter value and the second writeback counter value track a number of times each of the first cache line and the second cache line have been modified.

6. The method of claim 1, wherein preemptively writing back the cache line further comprises:
   in response to writing back a first cache line in the second cache associated with a first transaction identification tag, prioritizing writeback of a clean cache line in the second cache associated with the first transaction identification tag over a writeback of a dirty cache line in the second cache associated with a second transaction identification tag.

7. The method of claim 1, wherein the first cache is a last level of cache in a cache hierarchy.

8. The method of claim 7, further comprising:
   transmitting, from a memory controller of a system memory and the first cache controller of the first cache, an additional unused bandwidth message representing unused bandwidth between the system memory and the first cache during the first cycle;
   preemptively writing back, during a second cycle, a second cache line containing dirty data from the first cache to the system memory based on the additional unused bandwidth message; and
   writing over, in response to a cache miss to the first cache, the second cache line.

9. A processing system, comprising:
   a private cache associated with a processor core of a plurality of processor cores, the private cache comprising a private cache controller and a corresponding set of cache lines; and
   a shared cache shared by the plurality of processor cores, the shared cache comprising a shared cache controller and a shared set of cache lines, wherein the shared cache controller is configured to communicate an unused bandwidth message to the private cache controller in the private cache representing an unused bandwidth between the shared cache and the private cache during a first cycle.

10. The processing system of claim 9, wherein the private cache controller in the private cache is configured to calculate a number cache lines that are available to be preemptively written from the private cache to the shared cache without exceeding the unused bandwidth.

11. The processing system of claim 9, wherein the private cache controller in the private cache is configured to preemptively write over, in response to a cache miss, a cache line without evicting any data from the private cache.

12. The processing system of claim 9, further comprising:
   an additional shared cache, the additional shared cache comprising an additional shared cache controller and an additional shared set of cache lines, wherein the additional shared cache controller is configured to communicate an unused bandwidth message to the shared cache controller representing unused bandwidth between the shared cache and the additional shared cache during the first cycle.

13. The processing system of claim 12, wherein the additional shared cache is a last level of cache in a cache hierarchy.

14. The processing system of claim 13, further comprising:
   a system memory shared by the plurality of processor cores, the system memory including a memory controller, wherein the memory controller is configured to communicate an unused bandwidth message to the last level cache representing unused bandwidth between the system memory and the last level cache during the first cycle.

15. The processing system of claim 9, wherein the shared cache is a lower level cache relative to the private cache.

16. The processing system of claim 9, wherein the private cache controller of the private cache is configured to prioritize writeback of a first cache line in the private cache associated with a first writeback counter value that is lower than a second writeback counter value of a second cache line in the private cache, wherein the first writeback counter value and the second writeback counter value track a number of times each of the first cache line and the second cache line have been modified.

17. The processing system of claim 9, wherein the private cache controller of the private cache is configured to prioritize, in response to writing back a first cache line in the private cache associated with a first transaction identification tag, writeback of a clean cache line the private cache associated with a first transaction identification tag over writeback of a dirty cache line in the private cache associated with a second transaction identification tag.

18. A processor, comprising:
a private cache associated with a processor core of a plurality of processor cores, the private cache comprising a private cache controller and a corresponding set of cache lines; and
a shared cache shared by the plurality of processor cores, the shared cache comprising a shared cache controller and a shared set of cache lines, wherein the shared cache controller is configured to communicate an unused bandwidth message to the private cache controller in the private cache representing an unused bandwidth between the shared cache and the private cache during a first cycle.

19. The processor of claim 18, wherein the private cache controller the private cache is configured to calculate a number cache lines that are available to be preemptively written from the private cache to the shared cache without exceeding the unused bandwidth.

20. The processor of claim 18, further comprising:
an additional shared cache, the additional shared cache comprising an additional shared cache controller and an additional shared set of cache lines, wherein the additional shared cache controller is configured to communicate an additional unused bandwidth message to the shared cache controller representing unused bandwidth between the shared cache and the additional shared cache during the first cycle.

* * * * *